(12) United States Patent
Sekino et al.

(10) Patent No.: US 8,613,469 B2
(45) Date of Patent: Dec. 24, 2013

(54) AIRBAG DEVICE

(75) Inventors: Tadaaki Sekino, Osaka (JP); Keisuke Moritani, Osaka (JP); Takeshi Inazumi, Osaka (JP); Koichi Ishida, Osaka (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/390,736

(22) PCT Filed: Sep. 27, 2010

(86) PCT No.: PCT/JP2010/066680
§ 371 (c)(1),
(2), (4) Date: Feb. 16, 2012

(87) PCT Pub. No.: WO2011/037224
PCT Pub. Date: Mar. 31, 2011

(65) Prior Publication Data
US 2012/0146315 A1    Jun. 14, 2012

(30) Foreign Application Priority Data
Sep. 28, 2009 (JP) ................................ 2009-222806

(51) Int. Cl.
*B60R 21/237* (2006.01)
*B60R 21/205* (2011.01)

(52) U.S. Cl.
USPC ..................................... 280/743.1; 280/732

(58) Field of Classification Search
USPC ............................................ 280/743.1, 732
See application file for complete search history.

(56) References Cited

U.S. PATENT DOCUMENTS

| 6,619,691 B1 * | 9/2003 | Igawa ........................... 280/732 |
| 7,926,844 B2 * | 4/2011 | Williams et al. ........... 280/743.1 |
| 2002/0084635 A1 | 7/2002 | Tajima et al. |

FOREIGN PATENT DOCUMENTS

| JP | 6-255438 A | * | 9/1994 |
| JP | 8 72656 | | 3/1996 |
| JP | 10 44902 | | 2/1998 |
| JP | 11 123995 | | 5/1999 |
| JP | 2000-071911 | | 3/2000 |
| JP | 2002 255004 | | 9/2002 |
| JP | 2003 137060 | | 5/2003 |
| JP | 2008-007034 | | 1/2008 |
| JP | 2009-154577 | | 7/2009 |

OTHER PUBLICATIONS

International Preliminary Report on Patentability and Written Opinion issued Apr. 19, 2012, in International Application No. PCT/JP2010/066680 (with English translation).
International Search Report Issued Oct. 19, 2010 in PCT/JP10/66680 Filed Sep. 27, 2010.
Office Action issued Oct. 22, 2013, in Japan Patent Application No. 2009-222806 (with partial English Translation).

* cited by examiner

*Primary Examiner* — Ruth Ilan
(74) *Attorney, Agent, or Firm* — Oblon, Spivak, McClelland, Maier & Neustadt, L.L.P.

(57) ABSTRACT

An airbag device configured to be disposed in an instrument panel includes an inflator configured to generate gas, and an airbag that includes a gas inlet through which the gas from the inflator is introduced and is inflated and deployed in a bag shape toward a vehicle room side by the gas introduced from the inflator through the gas inlet. The airbag has, in an upper portion thereof, an extra length in a front and rear direction of a vehicle and is folded in a housed state after experiencing a folded state in an approximately planar fashion such that the extra length portion is tucked into the airbag toward the rear of the vehicle.

2 Claims, 10 Drawing Sheets

F I G. 1
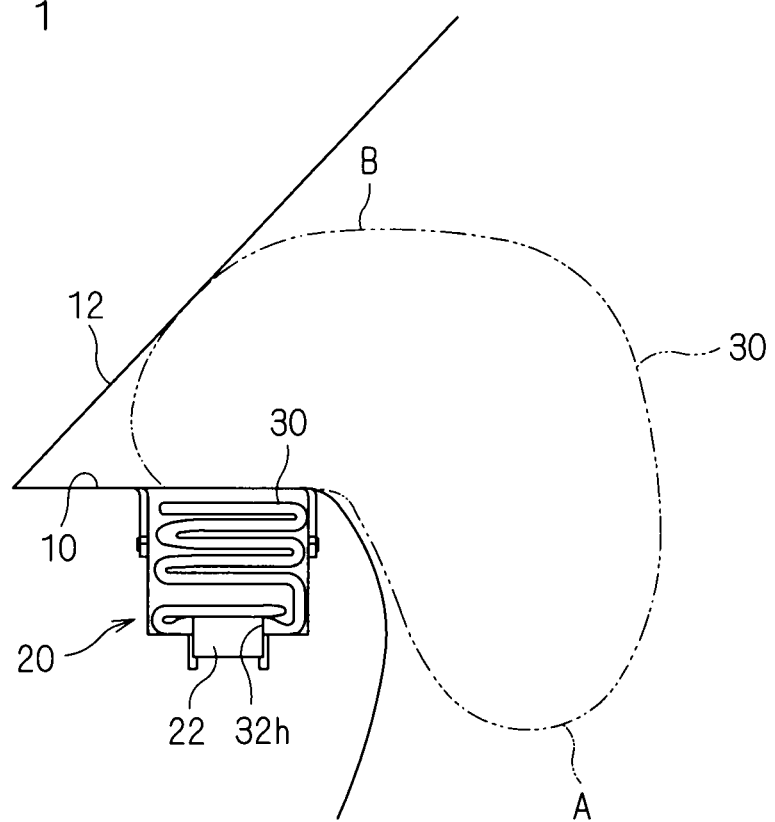

F I G. 7
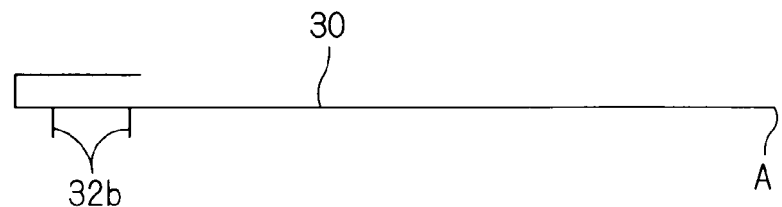
F I G. 8
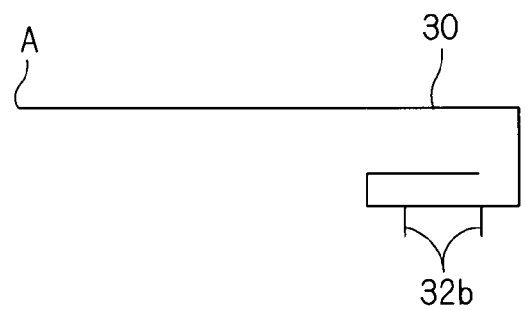
F I G. 9
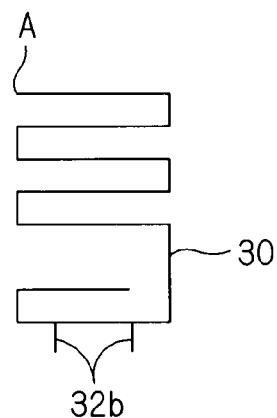

F I G . 1 0
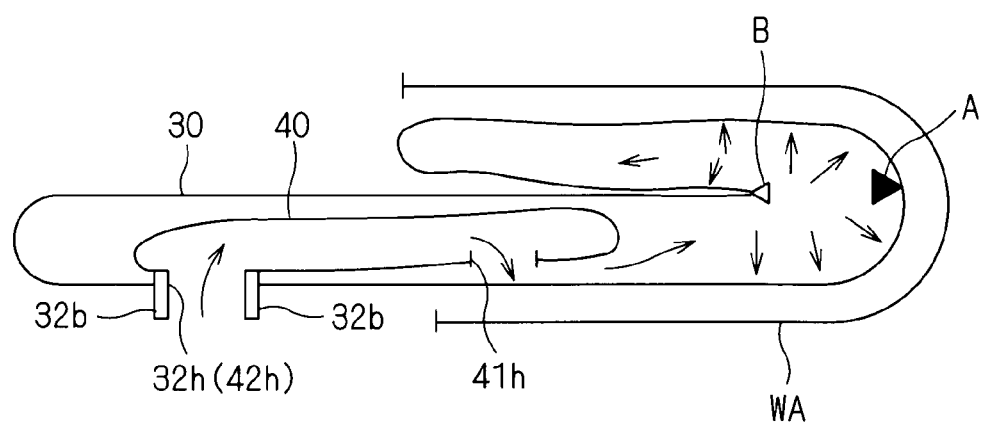

F I G. 1 3
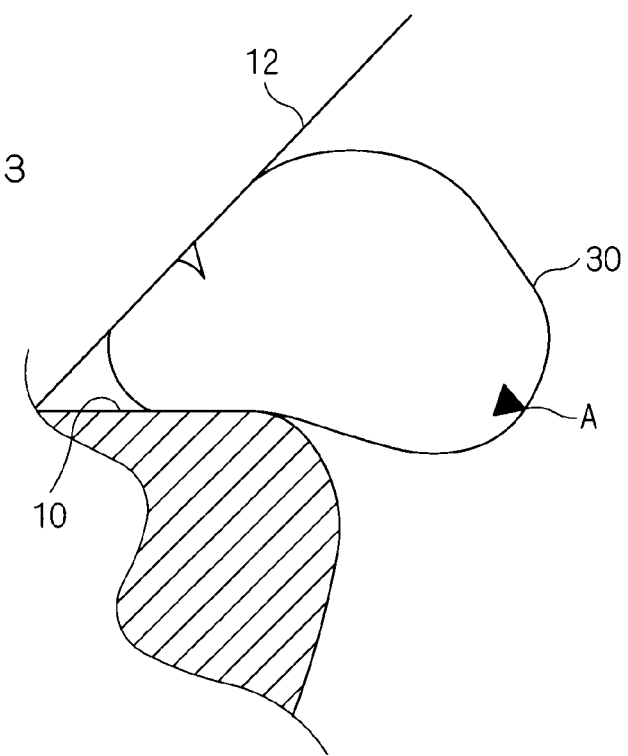
F I G. 1 4
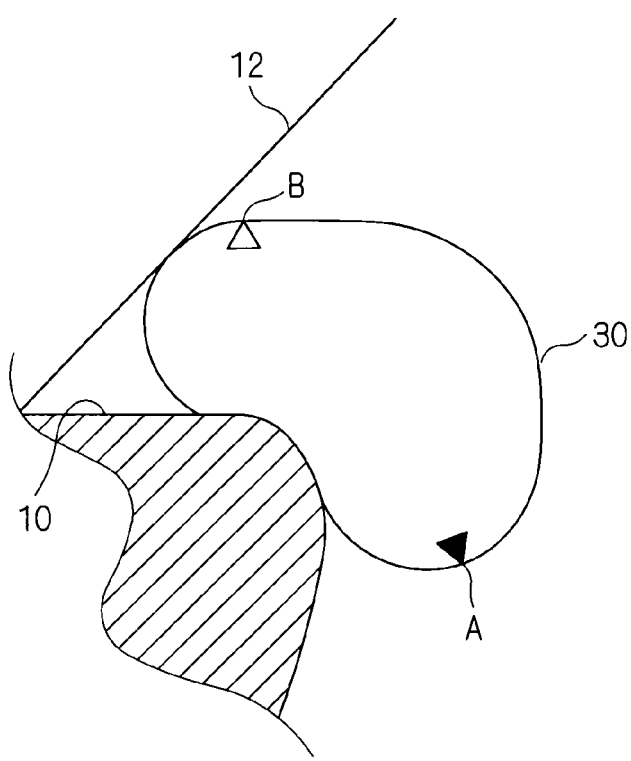

F I G. 1 7
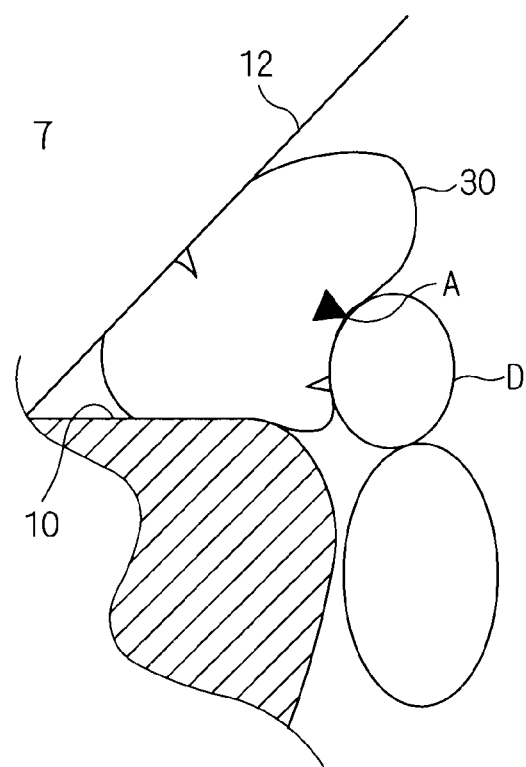
F I G. 1 8
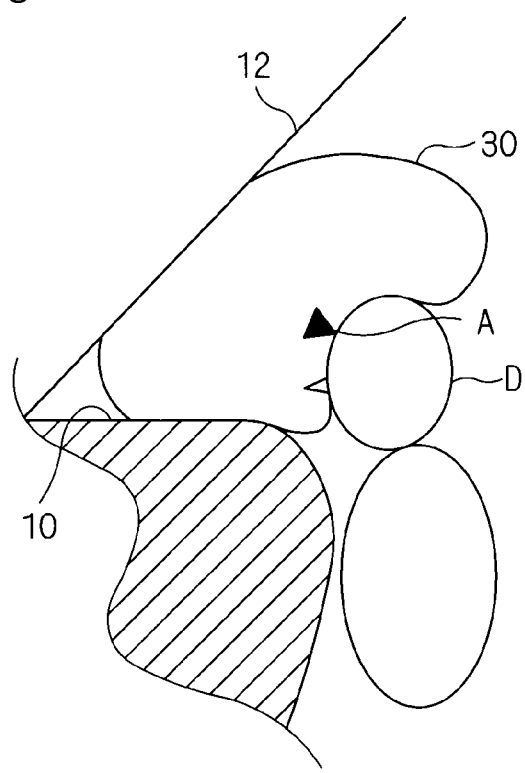

F I G . 1 9
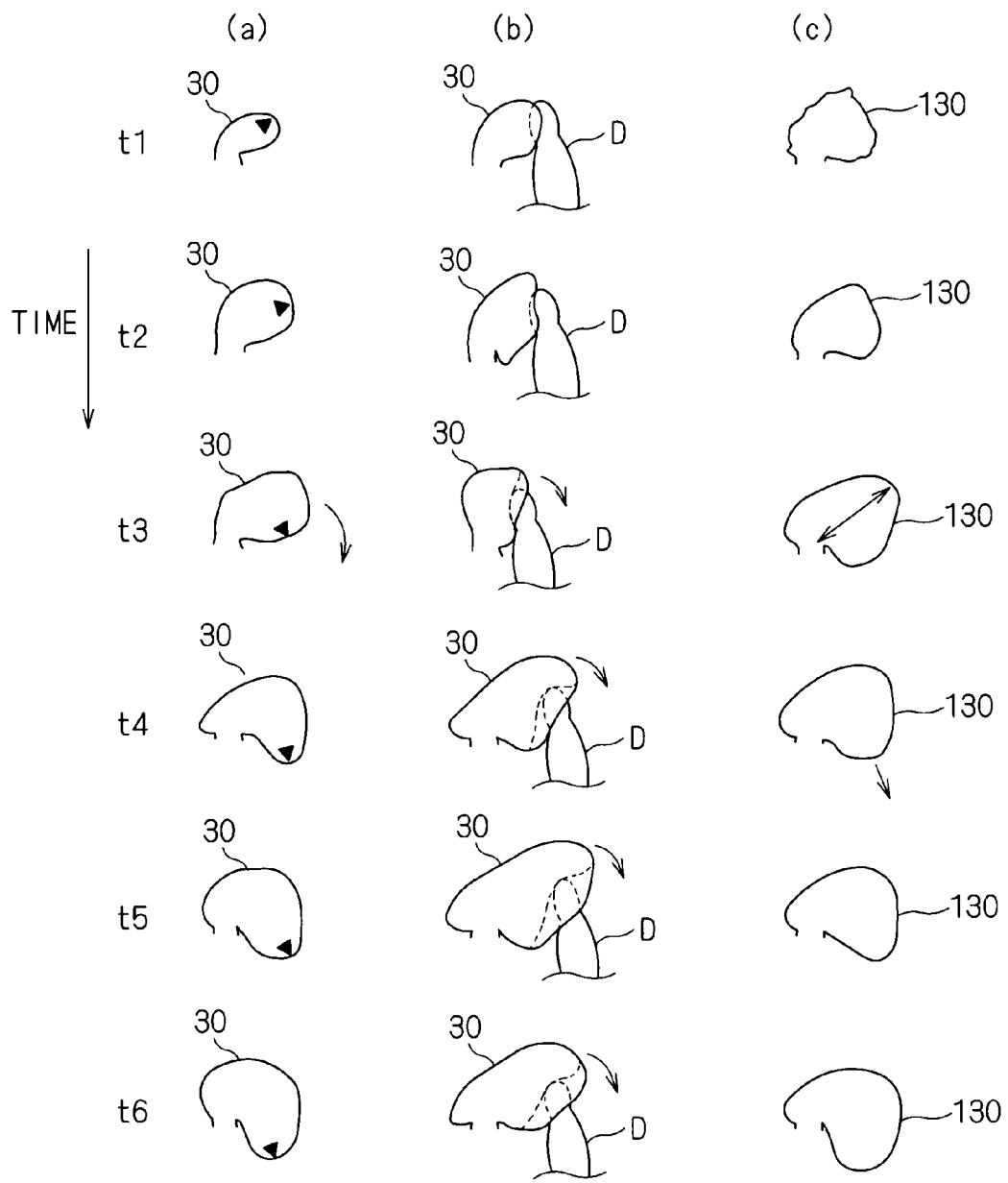

AIRBAG DEVICE

TECHNICAL FIELD

The present invention relates to an airbag device that protects an occupant by being inflated and deployed in the event of, for example, a vehicle collision.

BACKGROUND ART

Airbag devices serve to protect occupants by being inflated and deployed in the event of a vehicle collision or the like. In some cases, such an airbag device is demanded to mitigate a protruding movement of an airbag toward an occupant side after it is inflated to some extent as a countermeasure against an irregular seating position (also referred to as out of position (OOP)). Further, also in a regular seating position, a folded portion comes into contact with an occupant before being unfolded to be inflated at times. Therefore, it is demanded in some cases to reduce a deploying speed or a protruding amount or prevent the above-mentioned folded portion from coming into contact with an occupant.

Patent Document 1 discloses the technology of controlling an inflated state of an airbag by means of a tether that is cut when the airbag is inflated to some extent.

Patent Document 2 describes another related technology.

PRIOR ART DOCUMENTS

Patent Documents

Patent Document 1: Japanese Patent Application Laid-Open No. 2000-71911

Patent Document 2: Japanese Patent Application Laid-Open No. 2009-154577

SUMMARY OF THE INVENTION

Problem to be Solved by the Invention

Unfortunately, it is necessary in the technology disclosed in Patent Document 1 to additionally sew a tether to an airbag, which may lead to a cost increase due to increases in the number of components as well as the number of assembling operations.

Therefore, an object of the present invention is to enable to, with a configuration as simple as possible, receive an occupant by an inflated portion more reliably and mitigate a protruding movement toward the occupant side after being inflated to some extent.

Means to Solve the Problem

In order to solve the above-mentioned problem, an airbag device according to a first aspect is configured to be disposed in an instrument panel, which includes: an inflator configured to generate gas; and an airbag that includes a gas inlet through which the gas from the inflator is introduced and is inflated and deployed in a bag shape toward a vehicle room side by the gas introduced from the inflator through the gas inlet, wherein the airbag has, in an upper portion thereof, an extra length in a front and rear direction of a vehicle and is folded in a housed state after experiencing a folded state in an approximately planar fashion so that the extra length portion is tucked into the airbag toward a rear of the vehicle.

According to a second aspect, in the airbag device of the first aspect, a rectifying member directing the gas introduced through the gas inlet toward the vehicle rear side is provided in the airbag.

According to a third aspect, in the airbag device of the first or second aspect, the airbag is folded so that a position in the vicinity of a lower end thereof in an inflated and deployed state is positioned at an end thereof on the rear side of the vehicle in the folded state in the approximately planar fashion.

According to a fourth aspect, in the airbag device of any one of the first to third aspects, the airbag is folded in a bellows shape in the front and rear direction of the vehicle from the folded state in the approximately planar fashion so that an end thereof on the rear side of the vehicle in the folded state in an approximately planar shape is disposed on the top.

Effects of the Invention

According to the first aspect of the present invention, when the gas from the inflator is introduced into the airbag, the airbag first attempts to be deployed in the approximately planar state. In this case, the airbag has, in an upper portion thereof, an extra length in the front and rear direction of a vehicle, and experienced the folded state in an approximately planar fashion such that the extra length portion is tucked into the airbag toward the vehicle rear. Accordingly, the airbag first attempts to inflate and deploy a lower portion thereof in a small bag shape. After that, the airbag rotates downward while inflating the upper portion thereof. The airbag is first inflated and deployed in a small bag shape in this state, whereby it is possible to receive an occupant by the inflated portion more reliably. Further, at the stage after the inflation and deployment into a small bag shape, a protruding movement toward an occupant side is mitigated. This enables to, with a configuration as simple as possible, receive an occupant by an inflated portion more reliably and mitigate a protruding movement toward an occupant side after being inflated to some extent.

According to the second aspect, the gas introduced from the gas inlet is directed toward the rear side of the airbag more reliably. This allows the lower portion of the airbag to be inflated and deployed in a small bag shape toward an occupant side with more reliability.

According to the third aspect, the airbag is inflated in a small bag shape such that the position in the vicinity of the lower end in the inflated and deployed state projects first toward the occupant side. After that, the airbag rotates downward while being inflated and deployed mainly above the inflated portion. This further mitigates a protruding movement toward an occupant side after being inflated to some extent.

According to the fourth aspect, the airbag is easily inflated and deployed smoothly in the front and rear direction of the vehicle. Accordingly, the airbag is inflated and deployed rapidly until the lower portion thereof is first inflated and deployed in a small bag shape.

BRIEF DESCRIPTION OF DRAWINGS

FIG. 1 is a partial cross-sectional side view showing an airbag device according to an embodiment.

FIG. 7 is an explanatory view of the process of folding the airbag from the approximately planar folded state.

FIG. 8 is an explanatory view of the process of folding the airbag from the approximately planar folded state.

FIG. 9 is an explanatory view of the process of folding the airbag from the approximately planar folded state.

FIG. 10 is a view conceptually showing an airflow within the airbag in an initially deployed state.

FIG. 13 is an explanatory view showing the operation of deploying the airbag.

FIG. 14 is an explanatory view showing the operation of deploying the airbag.

FIG. 17 is an explanatory view showing the operation of deploying the airbag in a regular seating position.

FIG. 18 is an explanatory view showing the operation of deploying the airbag in a regular seating position.

FIG. 19 is a view showing an actual movement of inflating and deploying the airbag.

EMBODIMENT FOR CARRYING OUT THE INVENTION

Figure 2:
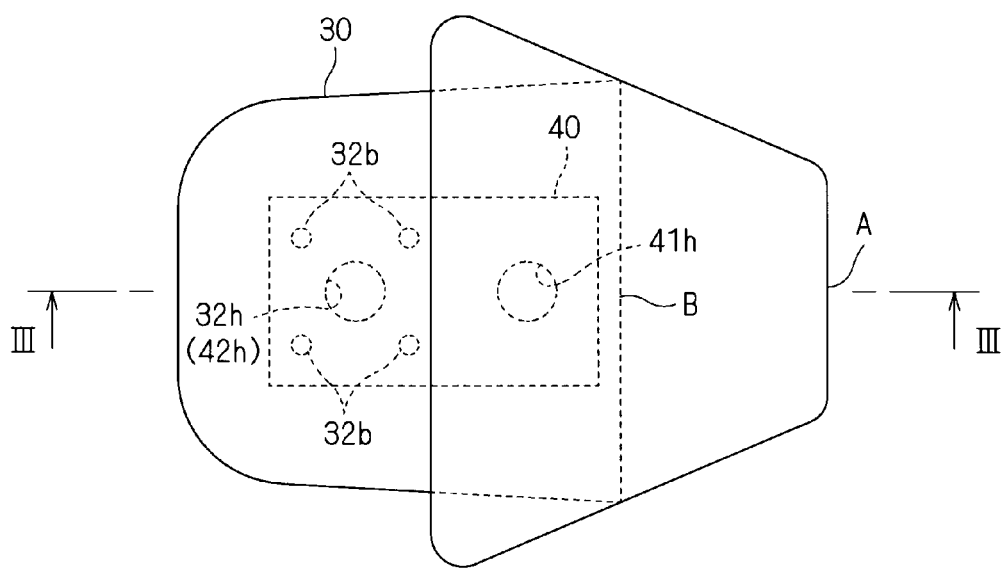
FIG. 2 is a schematic plan view showing an approximately planar folded state of an airbag.

Hereinafter, an airbag device according to an embodiment is described. FIG. 1 is a partial cross-sectional side view showing an airbag device 20 that is integrated into an instrument panel 10 and housed therein. FIG. 1 shows the state in which an airbag 30 is deployed by a chain double-dashed line. For the sake of description, in the description below, a front and rear direction, an up and down direction and a left and right direction are based on the direction in which the airbag device 20 is integrated into a vehicle and an occupant faces forward.

The airbag device 20 is disposed so as to be integrated inside a front window 12 of a vehicle and in an upper surface portion of the instrument panel 10 positioned in front of a passenger seat. The front window 12 is disposed above the instrument panel 10 in a backward-sloped position toward the top. The airbag device 20 is configured as a device that is inflated and deployed toward a front of a passenger-seat occupant in the event of, for example, a vehicle collision and receives the occupant in the passenger seat to absorb an impact.

The airbag device 20 includes an inflator 22 and the airbag 30.

The airbag 30 is formed of a fabric or the like into a bag shape having a gas inlet 32h. In a normal state, the airbag 30 is folded within the instrument panel 10 to be housed in a case. Meanwhile, the airbag 30 is configured so as to, when it is inflated and deployed in the event of a vehicle collision or the like, protrude and be inflated outside the instrument panel 10, and then be inflated and deployed in a bag shape toward the passenger-seat occupant side inside of a room by the gas introduced from the inflator 22 through the gas inlet 32h.

Formed in an area of the instrument panel 10 in which the airbag 30 is disposed is an easily-broken tear line for splitting the area into a plurality of pieces. Upon reception of a force for inflating and deploying the airbag 30, the upper surface portion of the case in the instrument panel 10 is split along the tear line, to thereby form an opening for inflating and deploying the airbag 30 toward the outside of the instrument panel 10.

The inflator 22 includes an ignition device, a gas generator and the like and is configured to ignite and burn the gas generator by the ignition device to generate gas. The inflator 22 is mounted onto the airbag 30 at a location and in a position where gas can be introduced into the airbag 30 through the gas inlet 32h. Upon reception of an ignition order signal or the like from, for example, an impact detection part of the vehicle, the ignition device is caused to ignite and burn the gas generator, and the thus generated gas is introduced into the airbag 30 through gas inlet 32h, to thereby inflate and deploy the airbag 30.

The airbag 30 is described in more detail.

The airbag 30 is configured so as to be inflated and deployed into a bag shape in which a rear portion (occupant-side portion) is inflated more in the up and down direction than a front portion. In the state in which the airbag 30 is completely inflated, a portion on the front end side of the airbag 30 is disposed in the vicinity of the upper surface of the instrument panel 10, and the portion on the rear side of the airbag 30 is disposed so as to extend in the up and down direction behind the instrument panel 10.

The above-mentioned airbag 30 is formed by, for example, sewing a belt-like center panel part into an approximately ring shape, and sewing side panel portions to the ring-shaped edges on both sides of the center panel part sewn into an approximately ring shape so as to seal the opening, to thereby form a bag shape.

Further, the gas inlet 32h is formed on the lower surface of the front portion of the airbag 30, that is, in the portion in which the airbag 30 is disposed in the vicinity of the upper surface of the instrument panel 10. Mounted to the portion of the airbag 30 in the vicinity of the gas inlet 32h is a bracket having an opening corresponding to the gas inlet 32h. Mounting bolts 32b as mounting members mounted to the bracket penetrate the airbag 30 from inside to outside around the gas inlet 32h. The airbag 30 is mounted and fixed to the case by means of the mounting bolts 32b.

A vent hole for exhaustion after the airbag 30 is inflated and deployed may be appropriately formed in the airbag 30.

Description is given of the state in which the airbag 30 is folded and housed (state in which the airbag 30 is allowed to be housed in and mounted to the instrument panel 10).

Figure 3:
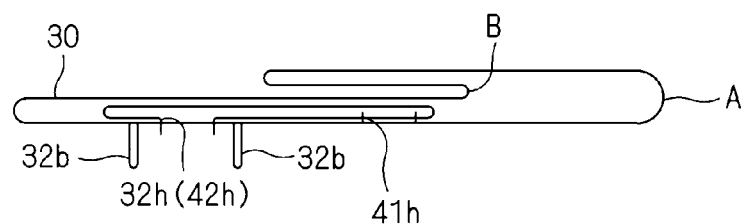
FIG. 3 is a schematic cross-sectional view taken along a line III-III of FIG. 2.

First, as shown in FIG. 2 and FIG. 3, the airbag 30 is folded in an approximately planar fashion. On this occasion, in the upper portion of the airbag 30, an extra length is provided in the front and rear direction of a vehicle, and the sagged portion due to the extra length is tucked into the airbag 30 toward the rear of the vehicle. In other words, the airbag 30 is folded in an approximately planar fashion such that the upper portion of the airbag 30 becomes longer than the lower portion of the airbag 30 in the front and rear direction of the vehicle. Then, among the upper portion of the airbag 30, the middle portion in the front and rear direction of the vehicle is valley-folded, and the portion positioned on the side closer to the rear of the vehicle than the valley-folded portion is mountain-folded, whereby the middle portion in the front and rear direction of the vehicle among the upper portion of the airbag 30 is tucked into the rear side of the airbag 30. Here, in the folded state in an approximately planar fashion, a lower portion refers to the portion extending in a planar fashion that includes the portion in which the gas inlet 32h is formed, while an upper portion refers to the portion disposed so as to extend above the lower portion with the line mountain-folded in the perimeter of the lower portion being a boundary. Further, with an outward-facing surface of the airbag 30 being a reference, mountain-folding refers to the case where a fold faces outward, while valley-folding refers to the case where the fold faces inward. Through the folding as described above, the airbag 30 is brought into a planar state for enabling bellows folding or the like performed later, and after the folded state in an approximately planar fashion, is further folded in the housed state.

In the folded state in an approximately planar fashion, it is preferable to fold the airbag 30 such that a position A in the vicinity of the lower end (see FIG. 1) in the inflated and deployed state is positioned at the end on the rear side of the vehicle. Now, description is given below also assuming that the position A in the vicinity of the lower end is set at the end on the rear side of the vehicle (that is, a fold portion on the rear side of the vehicle) in the folded state in an approximately planar fashion. The reason why the above is preferable is described below. Further, description is given of an example in which an upper position B in the front of the vehicle (see FIG. 1) is set at the end (valley-folded portion) tucked into the airbag 30 among the upper portion of the airbag 30.

A rectifying member 40 is provided in the airbag 30. The rectifying member 40 is configured so as to direct the gas introduced through the gas inlet 32h toward the vehicle-rear-side of the airbag 30.

Figure 4:
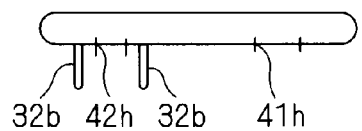
FIG. 4 is a cross-sectional view showing a rectifying member.

More specifically, as shown in FIG. 2 to FIG. 4, the rectifying member 40 is formed of a fabric or the like into a tube shape in which one end portion is open. Here, an opening 41h is formed in a side part on one end side of the rectifying member 40. It is preferable that the opening 41h be disposed on the side closer to the front of the vehicle than the valley-folded portion (see position B) of the upper portion in the airbag 30 (see FIG. 10). Needless to say, an opening may be formed at the edge on one end side of the rectifying member 40. A communication hole 42h communicated with the gas inlet 32h is formed in the side part in the other end side portion of the rectifying member 40. Then, in the state in which the rectifying member 40 is disposed in the airbag 30 such that the perimeter of the communication hole 42h overlaps the perimeter of the gas inlet 32h, the airbag 30 and the rectifying member 40 are mounted and fixed to the instrument panel 10 by means of the bracket and the mounting bolts 32b. In the state in which the rectifying member 40 is integrated into the airbag 30 as described above, the opening 41h is disposed on the side closer to the rear of the vehicle than the gas inlet 32h. The gas introduced from the gas inlet 32h passes through the opening 41h from the inside of the rectifying member 40 to be directed toward the vehicle-rear-side of the airbag 30.

It suffices that the rectifying member 40 is capable of directing gas mainly toward the rear of the vehicle, and an opening configured to emit gas may be formed in the middle portion in the front and rear direction of the vehicle or on the other end side being the front side of the vehicle.

The rectifying member 40 is folded in the above-mentioned approximately planar fashion together with the airbag 30 in the state of being integrated in the airbag 30.

Figure 5:
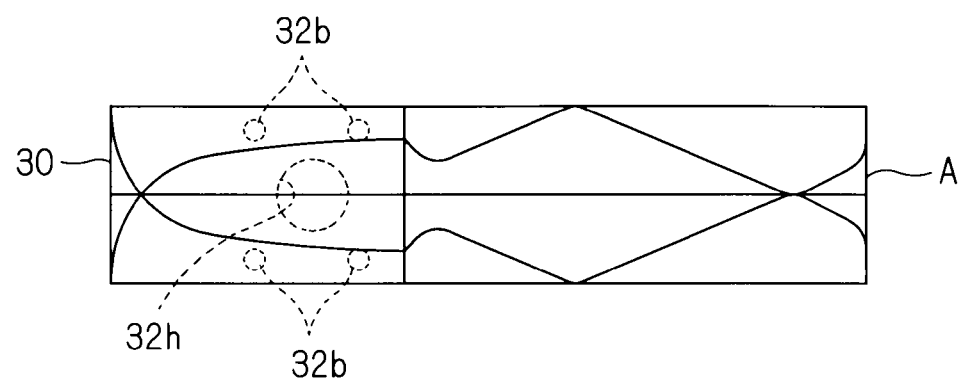
FIG. 5 is an explanatory view of the process of folding the airbag from the approximately planar folded state.
Figure 6:
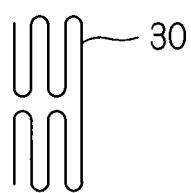
FIG. 6 is an explanatory view of the airbag shown in FIG. 5 viewed from a rear of a vehicle.

The airbag 30 is folded in an approximately planar fashion as described above, and then, as shown in FIG. 5 and FIG. 6, both end portions in the vehicle width direction thereof are folded into a belt-like shape in an approximately planar fashion in which the dimension in the vehicle width direction is approximately even in the front and rear direction of the vehicle. The both end portions in the vehicle width direction of the airbag 30 are folded in a bellows shape in this case, which may be folded into a roll shape.

Next, as shown in FIG. 7, the portion of the airbag 30 on the side closer to the vehicle front than the gas inlet 32h is folded above the portion of the airbag 30 in which the gas inlet 32h is formed (in this case, folded back once). After that, as shown in FIG. 8 and FIG. 9, the portion of the airbag 30 on the side closer to the rear of the vehicle than the gas inlet 32h is further folded above the portion of the airbag 30 in which the gas inlet 32h is formed (in this case, folded back in a bellows shape four times). In this case, the portion of the airbag 30 on the side closer to the rear of the vehicle than the gas inlet 32h is folded in a bellows shape such that, the end of the airbag 30 on the rear side of the vehicle (in this case, identical to the position A in the vicinity of the lower end of the airbag 30) in the folded state in an approximately planar fashion is disposed at the top in the finally housed state. Needless to say, the portion of the airbag 30 on the side closer to the rear of the vehicle than the gas inlet 32h does not necessarily need to be folded in a bellows shape. For example, the portion of the airbag 30 on the rear side of the vehicle may be folded in a roll shape and, in this case, the portion on the rear side of the vehicle is preferably folded in a roll shape in the lower portion thereof.

Through the above, the airbag 30 is folded in a housed state in which it can be housed in the upper surface portion of the instrument panel 10, and is integrated in the upper surface portion of the instrument panel 10 together with the inflator 22 in the housed state.

An operation of deploying the airbag device 20 configured as described above is described. FIG. 10 is a view conceptually showing an air flow in the airbag 30 in the initial state, and FIG. 11 to FIG. 14 are explanatory views showing the operation of deploying the airbag 30. In the views below, the position A in the vicinity of the lower end of the airbag 30 is indicated by a black triangular mark and the upper position B of the airbag 30 in the front of the vehicle is indicated by an open triangular mark in some cases.

First, when the inflator 22 operates in the event of, for example, a vehicle collision, the gas from the inflator 22 is introduced into the airbag 30 through the gas inlet 32h. In this case, the gas passes through the rectifying member 40 from the gas inlet 32h and is introduced into the airbag 30. Then, the airbag 30 first attempts to be deployed in a planar fashion in the front and rear direction of the vehicle. In the state in which the airbag 30 is deployed in the front and rear direction of the vehicle to some extent, as shown in FIG. 10, the airbag 30 in the folded state in an approximately planar fashion attempts to be inflated while forming a small air chamber with the position A in the vicinity of the lower end facing the rear side of the vehicle, in the portion extending from the portion in the vicinity of the opening 41h in the lower portion thereof to the mountain-folded portion of the upper portion thereof (see a portion WA of FIG. 10). On this occasion, air is directed toward the vehicle rear in the airbag 30 by the rectifying member 40, with the result that the airbag 30 can be inflated and deployed more reliably in the state in which the position A in the vicinity of the lower end faces the rear side of the vehicle.

On this occasion, the portion of the upper portion of the airbag 30, which is valley-folded to be tucked into the airbag 30, is pressed to be superimposed by the internal pressure of the air, which suppresses the airbag 30 from being abruptly inflated and deployed. In other words, the portion of the upper portion of the airbag 30, which is valley-folded to be tucked into the airbag 30, is deployed falling behind the portion that is inflated while forming a small air chamber in the portion WA.

Figure 11:
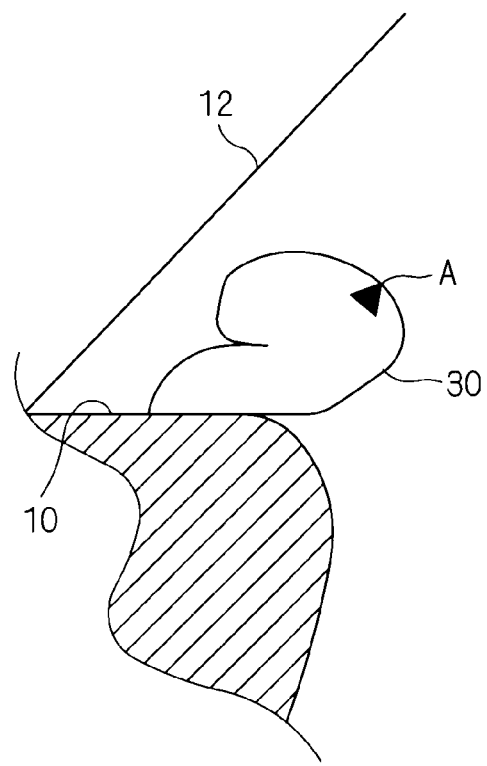
FIG. 11 is an explanatory view showing an operation of deploying the airbag.
Figure 12:
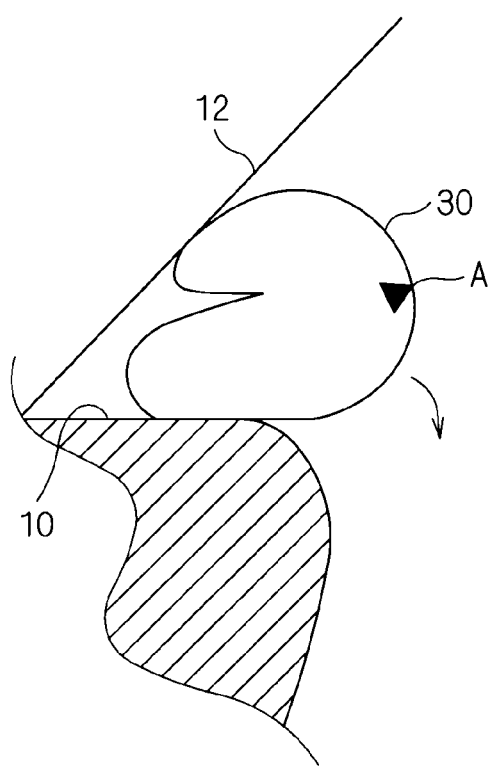
FIG. 12 is an explanatory view showing the operation of deploying the airbag.

When the gas from the inflator 22 is further introduced into the airbag 30, as shown in FIG. 11, the small air chamber at the portion WA is inflated and deployed by a larger amount, and the portion of the upper portion of the airbag 30, which is valley-folded to be tucked into the airbag 30, attempts to be inflated and deployed as well. When the small air chamber formed portion at the portion WA becomes large to some extent, as shown in FIG. 12, it rotationally moves downward around a portion to which the airbag 30 is mounted. This rotational movement is made by any of the actions described below or a composite action. That is, the distance between the position A in the vicinity of the lower end of the airbag 30 and the fixed position of the airbag 30 is smaller in the lower portion of a circumference thereof than the upper portion of the circumference thereof. Accordingly, in the state in which the small air chamber formed portion at the portion WA is inflated to some extent, the lower portion of the small air chamber formed portion at the portion WA is pulled in the front and rear direction of the vehicle, and the upper portion thereof sags in the front and rear direction of the vehicle. As a result, the small air chamber formed portion at the portion WA is pulled downward, which may act as the force for rotationally moving the small air chamber formed portion at the portion WA downward. The internal pressure acting on the small air chamber formed portion at the portion WA through gas introduction acts mainly as the direction (force for inflation) in which sagging of the airbag 30 is released in the upper portion of the small air chamber formed portion at the portion WA, which may act mainly as the force for pressing downward in the lower portion that has been inflated and deployed, that is, the force for rotationally moving the small air chamber formed portion at the portion WA downward. When the portion of the upper portion of the airbag 30, which is valley-folded to be tucked into the airbag 30, is inflated and deployed, that portion comes into contact with the inner surface of the front window 12. Accordingly, the force for inflation and deployment after the contact state may act as the force for pushing down the small air chamber formed portion at the portion WA to become apart from the front window 12, that is, as the force for downward rotational movement. Any of the above-mentioned actions or a composite action causes the small air chamber formed portion at the portion WA to rotationally move downward.

Then, upon further gas introduction, as shown in FIG. 13, the position A in the vicinity of the lower end gradually moves downward while the portion in the vicinity of the upper position B in the front of the vehicle is being inflated and deployed. Eventually, as shown in FIG. 14, the airbag 30 is inflated and deployed until the position A in the vicinity of the lower end moves to the lower end.

In a case where a passenger-seat occupant is in a regular seating position, normally, the occupant is received by the airbag 30 that has been inflated and deployed to be in the state shown in FIG. 13 or FIG. 14.

Figure 15:
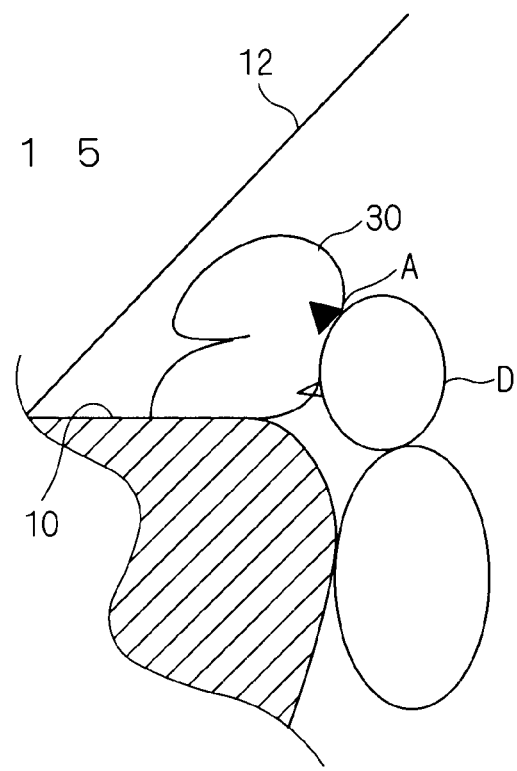
FIG. 15 is an explanatory view showing an operation of deploying the airbag in a regular seating position.
Figure 16:
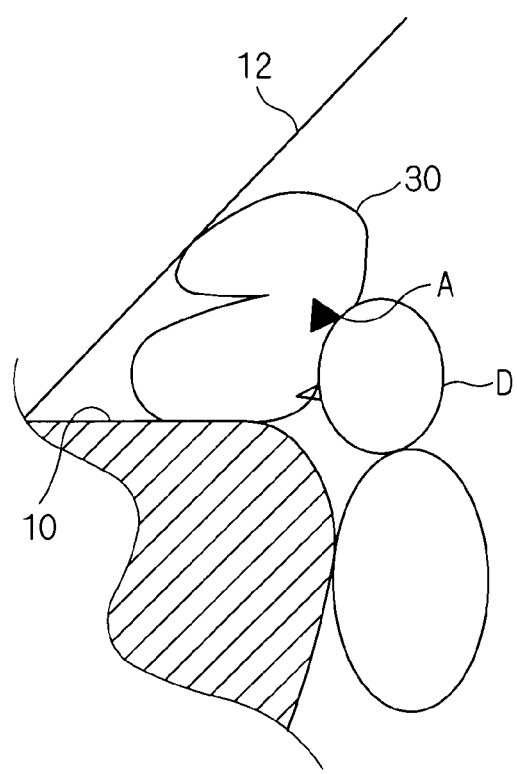
FIG. 16 is an explanatory view showing the operation of deploying the airbag in a regular seating position.

In the case where a passenger-seat occupant is in a regular seating position and is close to the instrument panel 10, as shown in FIG. 15, a passenger-seat occupant D comes into contact with the airbag 30 at a relatively early stage after the inflation and deployment of the airbag 30. As shown in FIG. 15 or FIG. 16, even if the passenger-seat occupant D comes into contact with the airbag 30 in the early state of inflation and deployment, the small air chamber formed portion at the portion WA is in the state in which an internal pressure has rose to some extent and is accordingly capable of receiving an impact of the passenger-seat occupant D. In order to perform degassing when an impact is received also in this state, it is preferable to form a vent hole in the small air chamber formed portion at the portion WA.

After the passenger-seat occupant D in a regular seating position is received at the early stage of the inflation of the airbag 30 in this manner, the airbag 30 is inflated and deployed while attempting to rotate the small air chamber formed portion at the portion WA downward. On this occasion, as shown in FIG. 17, the position A in the vicinity of the lower end of the airbag 30 is in contact with a head or the like of the passenger-seat occupant D, which suppresses a downward movement of the small air chamber formed portion at the portion WA. As a result, as shown in FIG. 18, the airbag 30 is inflated mainly above the passenger-seat occupant D. Therefore, after the airbag 30 comes into contact with the passenger-seat occupant D, an impact acting on the passenger-seat occupant D toward the rear of the vehicle is relieved owing to further inflation and deployment of the airbag 30.

According to the airbag device 20 configured as described above, the airbag 30 first attempts to be deployed in an approximately planar fashion when the gas from the inflator 22 is introduced into the airbag 30. In this approximately planar state, the airbag 30 has an extra length in the upper portion thereof and also is folded so as to be tucked into the airbag 30 with the extra length portion facing the rear of the vehicle, and accordingly the airbag 30 attempts to be inflated and deployed into a bag shape so as to form a small air chamber mainly in the lower portion thereof. Then, when the small air chamber formed portion becomes large to some extent, the airbag 30 is further inflated and deployed so as to rotate the small air chamber formed portion downward while inflating the upper portion thereof. This enables to, whether in a regular seating position or in an irregular seating position, receive an occupant by the small air chamber formed position or the portion that has been inflated and deployed further from the above-mentioned state, with the result that the occupant is received by the inflated portion more reliably. Further, after the formation of the small air chamber portion of some size, the airbag 30 is inflated and deployed while rotationally moving the small air chamber downward, which suppresses a protruding movement toward the occupant side. Accordingly, even when a tether is not additionally sewn, it is possible to receive the occupant by the inflated portion more reliably and suppress the airbag 30 that has been inflated to some extent from protruding toward the occupant side with a relatively simple configuration.

Further, the gas introduced from the gas inlet 32h is directed toward the rear side in the airbag 30 by the rectifying member 40, and thus the inflation and deployment movement of the airbag 30 is stabilized, which enables the airbag 30 to be inflated and deployed so as to form a small air chamber mainly in the lower portion thereof with the position A in the vicinity of the lower end of the airbag 30 facing the occupant side and protruding in a more reliable manner.

Further, in the folded state in an approximately planar fashion, the position A in the vicinity of the lower end in the inflated and deployed state is folded so as to be positioned at the end on the rear side of the vehicle. This enables the airbag 30 to be inflated and deployed so as to form a small air chamber mainly in the lower portion thereof with the position A in the vicinity of the lower end protruding toward the occupant side. Then, after that, it is possible to inflate and deploy the entire airbag 30 while rotating the small air chamber formed portion downward. This enables the airbag 30 to be inflated and deployed rapidly while suppressing a protruding movement of the airbag 30 toward the occupant side after the airbag 30 is inflated and deployed to some extent. It suffices that the position A in the vicinity of the lower end is set at any position in the region facing downward in the state in which the airbag 30 is inflated and deployed, which is preferably set at the position in a lowermost end in the state in which the airbag 30 is inflated and deployed.

Further, the airbag 30 is folded in a bellows shape such that the end on the rear side of the vehicle (in this case, position A in the vicinity of the lower end) in the folded state in an approximately planar fashion is disposed at the top, whereby the airbag 30 is easily inflated and deployed smoothly in the front and rear direction of the vehicle in the initial state of inflation and deployment. This allows the lower portion of the airbag 30 to be easily inflated and deployed stably as well as rapidly so as to form a small air chamber.

While the airbag device has been shown and described in detail, the foregoing description is in all aspects illustrative and not restrictive. It is therefore understood that numerous modifications and variations can be devised without departing from the scope of the invention.

EXAMPLE

An airbag was actually manufactured and its inflation and deployment movement was observed, which is shown in FIG. 19. A column (a) of FIG. 19 shows the movement in which the airbag 30 according to the embodiment above is deployed in time ordering (t1 to t6). A column (b) of FIG. 19 shows a movement in which the airbag 30 according to the embodiment above is deployed in a case where a dummy D in a regular seating position is placed. A column (c) of FIG. 19 shows, as a comparative example, a movement in which a similar airbag 130 is deployed in a case where the airbag 130 is folded in an approximately planar fashion while causing the upper portion and lower portion thereof to have approximately the same dimension in the front and rear direction of the vehicle, and is then folded in a housed state.

In the case of the airbag 30 according to the present embodiment, it was confirmed that the position A in the vicinity of the lower end protruded toward the occupant side to some extent as shown in times t1 and t2 in the column (a) of FIG. 19, and then, the airbag was further inflated and deployed while the small air chamber formed portion was being rotationally moved downward as shown in times t3 to t6.

In the case of placing the dummy D in a regular seating position, it was confirmed that the dummy D came into contact with the small air chamber formed portion at the stage where the airbag 30 formed the small air chamber as shown in the time t1 of the column (b) of FIG. 19, and then, the remaining portion of the airbag 30 was inflated and deployed mainly above a head of the dummy D while the head of the dummy D was being immersed into the small air chamber formed portion of the airbag 30 as shown in the times t2 to t6.

On the other hand, it was confirmed in the case of the comparative example that the airbag 130 was inflated in the state in which it became wrinkled entirely with a small internal pressure at the initial stage of inflation and deployment as shown in the times t1 and t2 of the column (c) of FIG. 19 and protruded considerably toward the occupant side at the time t3, and then, the lower portion (chest area of the passenger-seat occupant) was inflated and deployed.

The invention claimed is:

1. An airbag device configured to be disposed in an instrument panel, comprising:
an inflator configured to generate gas; and
an airbag that includes a gas inlet through which the gas from said inflator is introduced and is inflated and deployed in a bag shape toward a vehicle room side by the gas introduced from said inflator through said gas inlet,
wherein said airbag has, in an upper portion thereof, an extra length in a front and rear direction of a vehicle and is folded in a housed state after experiencing a folded state in an approximately planar fashion so that the extra length portion is tucked into said airbag toward a rear of the vehicle, and
wherein a portion of said airbag on the side closer to the vehicle front than said gas inlet is folded above a portion of said airbag in which said gas inlet is formed, a portion of said airbag on the side closer to the rear of the vehicle than said gas inlet is further folded thereabove, and
wherein said airbag is folded in a bellows shape in the front and rear direction of the vehicle from said folded state in the approximately planar fashion so that an end thereof on the rear side of the vehicle in said folded state in an approximately planar shape is disposed on the top.

2. The airbag device according to claim 1, wherein said airbag is folded so that a position in the vicinity of a lower end thereof in an inflated and deployed state is positioned at an end thereof on the rear side of the vehicle in said folded state in the approximately planar fashion.

* * * * *